(12) United States Patent
Jackson

(10) Patent No.: US 10,181,246 B1
(45) Date of Patent: Jan. 15, 2019

(54) UNIVERSAL USER VARIABLE CONTROL UTILITY (UUVCU)

(71) Applicant: William David Jackson, Seattle, WA (US)

(72) Inventor: William David Jackson, Seattle, WA (US)

( * ) Notice: Subject to any disclaimer, the term of this patent is extended or adjusted under 35 U.S.C. 154(b) by 0 days.

(21) Appl. No.: 15/861,066

(22) Filed: Jan. 3, 2018

(51) Int. Cl.
  *H04L 12/58* (2006.01)
  *G08B 21/02* (2006.01)

(52) U.S. Cl.
  CPC ......... *G08B 21/0291* (2013.01); *H04L 51/32* (2013.01)

(58) Field of Classification Search
  CPC ............................. G08B 21/0291; H04L 51/32
  USPC ....................................................... 340/573.1
  See application file for complete search history.

(56) References Cited

U.S. PATENT DOCUMENTS

| | | | |
|---|---|---|---|
| 2015/0264304 A1* | 9/2015 | Chastney | H04N 7/147 715/719 |
| 2015/0332088 A1* | 11/2015 | Chembula | G06K 9/00 382/203 |
| 2016/0117147 A1* | 4/2016 | Zambetti | G06F 3/0236 715/727 |
| 2016/0259502 A1* | 9/2016 | Parrott | G06F 3/0482 |
| 2016/0261675 A1* | 9/2016 | Block | H04W 4/21 |
| 2016/0306438 A1* | 10/2016 | Kehoe | G06F 3/04886 |
| 2017/0060354 A1* | 3/2017 | Luo | H04L 51/10 |
| 2017/0098122 A1* | 4/2017 | el Kaliouby | A61B 5/744 |
| 2017/0236001 A1* | 8/2017 | McLean | G06K 9/00281 345/620 |
| 2017/0315699 A1* | 11/2017 | Markus | H04W 4/02 |
| 2018/0081515 A1* | 3/2018 | Block | G06F 3/0486 |
| 2018/0189072 A1* | 7/2018 | Mobeen | G06Q 50/01 |

* cited by examiner

*Primary Examiner* — Santiago Garcia

(57) ABSTRACT

The Universal User Variable Control Utility (UUVCU) is a method and system provided to allow users increased variable control over electronic communication. This invention allows users to vary (not limited) symbols; color, movement rate, and add text. With this invention a child can manually or automatically signal a parent when in danger, a senior citizen or a Veteran can alert loved ones or caregivers in life threatening times of need. UUVCU in helping people provides real world value accomplished through practical application.

1 Claim, 6 Drawing Sheets

UNIVERSAL USER VARIABLE CONTROL UTILITY (UUVCU)

Universal User Variable Control Utility (UUVCU) allows users greater creative expression in social media/messaging and the passing of information/data for critical applications. Critical applications are medical, health, public, child and veteran safety. UUVCU in helping people provides real world value accomplished through practical application.

DESCRIPTION OF WORK

UUVCU is a Business Method and System to uniquely change an electronic objects color, movement rate, and embed text (not limited). When UUVCU method is implemented via programming a user can input variable information that creates a new and unique outcome. This outcome can accomplish simple tasks like making someone happy to complex task such as helping to save lives. Thus UUVCU produces useful concrete and tangible results.

Hugs from the Heart (Hugs) is a small computer application (App), like a computer game, created to demonstrate the first tangible implementation of the UUVCU (FIG. 1). Secondly, the code is written to allow user input variability (FIG. 2). Third, input is transformed into a new unique outcome (FIG. 3). Fourth, the new outcome/data is transmitted (FIG. 4). Sixth, the transmission is received (FIG. 5). Finally, a response is generated at receiver discretion (FIG. 6).

UUVCU is designed to run on cell phones and tablets, both Apple, Android and future applications such as: watches, monitors, server to server and computer to computer (not limited). The first Hugs implementation allows a user to send a symbol (i.e., emoji). In this first case, a heart. However, with the UUVCU the Hug symbol is uniquely variable by the user. The symbol, called a Hug, is then sent and received. Hugs are then replied to if the receiver elects to reply. In other applications, data will flow without user active engagement (not limited), i.e., sensory medical, biometric or other emergency information.

FIELD OF INVENTION

The Field of Invention is Business Method and System of Human Necessities. The manner and process in the demonstration App, Hugs, is to first select the heart object (not limited). Next, one adjusts the variables to one's liking (not limited), i.e., color, beat rate, and add text. Finally, the Hug is sent and replied to at the option of the receiver. In critical applications, sensory devices will send info. automatically, potentially improving survivability of Vets, seniors and children.

BACKGROUND

While there are large amounts of communication over the Internet, there is little to no ability for users to vary input for fun or critical needs. Users can select emojis, background colors and type text. However, a user can not modify or vary these elements to a more personalized or specific need. The UUVCU allows users to modify communications.

This Non-Provisional Patent Application is for a utility that will revolutionize Internet communications (not limited). It is called the Universal User Variable Utility (UUVCU). Essentially, UUVCU allows user input to customize heretofore non-customizable communications. The benefit is that UUVCU makes the Internet even more engaging, personal and critically supportive.

Three example uses of the UUVCU.

1. Social Media becomes personal as users vary responses as never before. UUVCU will enhance social media through additional engagement. Users will be thrilled to engage in new levels of emotional/data exchange.
2. Imagine a war veteran, a senior citizen, or a child at school, wearing a watch, bracelet etc (not limited). that reads biometric info. like heart rate, temperature, and perhaps endorphins (not limited). Then it automatically translates that info. to, lets say an emoji or data stream. That emoji/data can then share those feelings, happy or distressed, etc. with loved ones. A response to this UUVCU could make a soldier, senior or students day. We may even contribute to the saving of lives, increase of comfort, lower depression and reduce bullying.
3. A business person could be trapped in one more boring meeting. Then an emoji arrives indicating their significant other lovingly and anxiously awaits their presence. In this case, UUVCU can save us all from boredom. Meeting adjourned.

"Hugs from the Heart" (Hugs) is an example App developed to allow users to send an emoji (not limited), like a heart (not limited). What is unique is that the user can vary the color, speed of heartbeat and embed text (not limited). See attached screenshots.

BRIEF SUMMARY OF THE INVENTION

People will benefit from increased user variable input into their electronic communications (not limited). Such input can better facilitate the beneficial transmission of feeling states, emotions and other critical data.

The Nature of Utility

The Utility submitted is a Business and Method utility increasing user variable control of Internet based communications (not limited). The invention process and methods are evidence in the submission of a small computer application (App), called Hugs from the Heart (Hugs). Hugs runs on Android and Apple iOS phones and tablets (not limited).

UUVCU:

UUVCU allows users to (not limited) change color, speed of movement, and add text to select objects, i.e., a beating heart changed to the nuanced color and beat rate of one's current feelings with imbedded original text or other objects. A little dog that might run or jump higher or faster with user input.

- Is innovative in that our research shows this user variable capability does not exist.
- Is utilitarian in that it provides useful functions, i.e., informing care providers of patient physiological/psychological status as well as cheering up Veterans, children and other loved ones via personalized feeling transmission.
- Allows social media to become more user variable With a focus on Interpersonal and Intrapersonal Communications, this work is prescient. The understanding of human communication needs has also developed over years of working with business, education, government, disadvantaged youth, and elders. Public Interest is served through the encouragement of such a creative and useful utility.

DETAILED DESCRIPTION OF THE INVENTION

Figure 1:
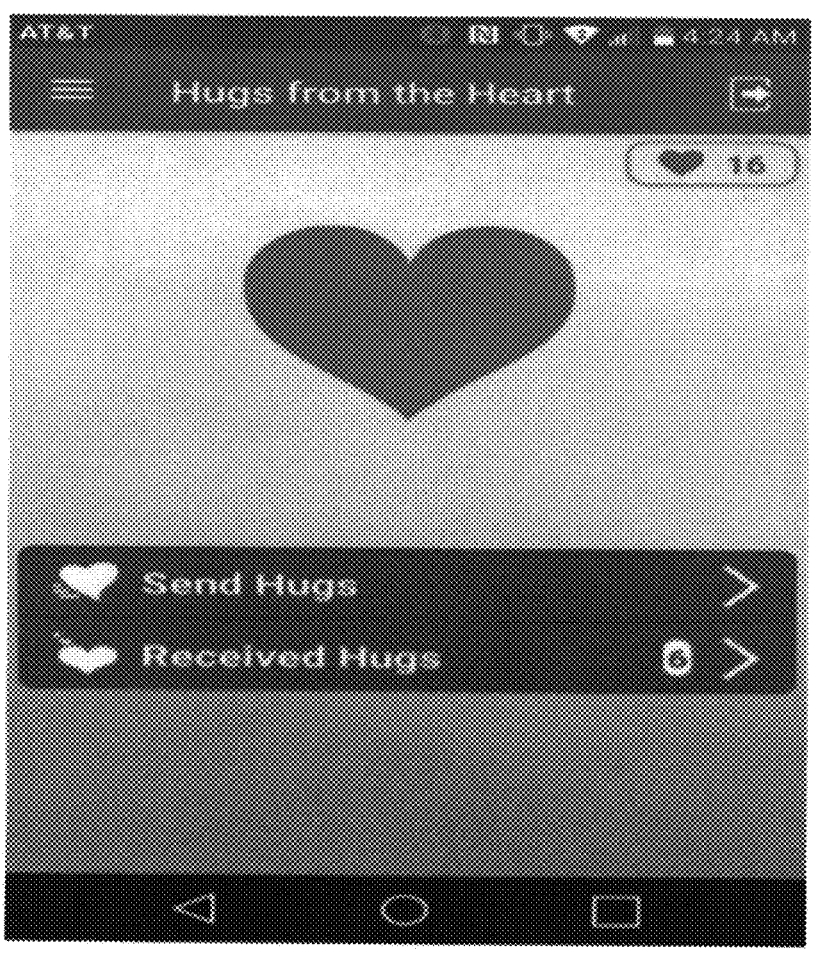
FIG. 1 Demonstration App Hugs from the Heart Start Screen.
Figure 2:
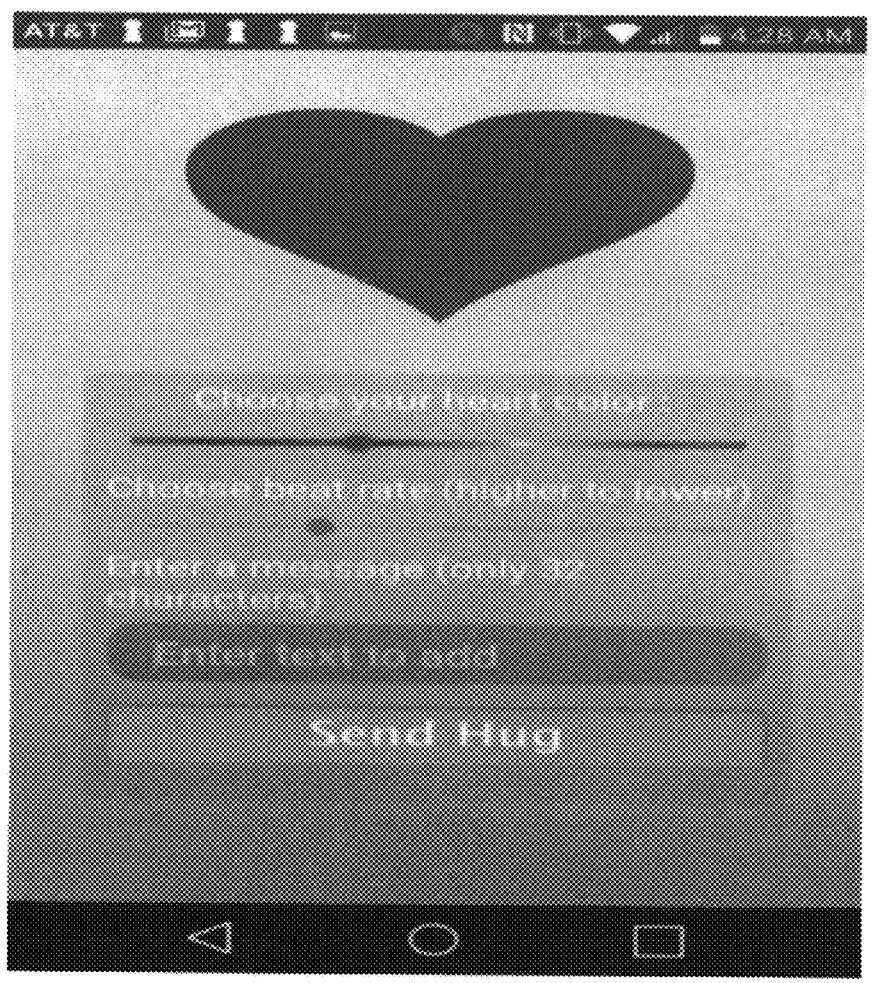
FIG. 2 Allows user input variability of color, movement speed and text entry (not limited).
Figure 3:
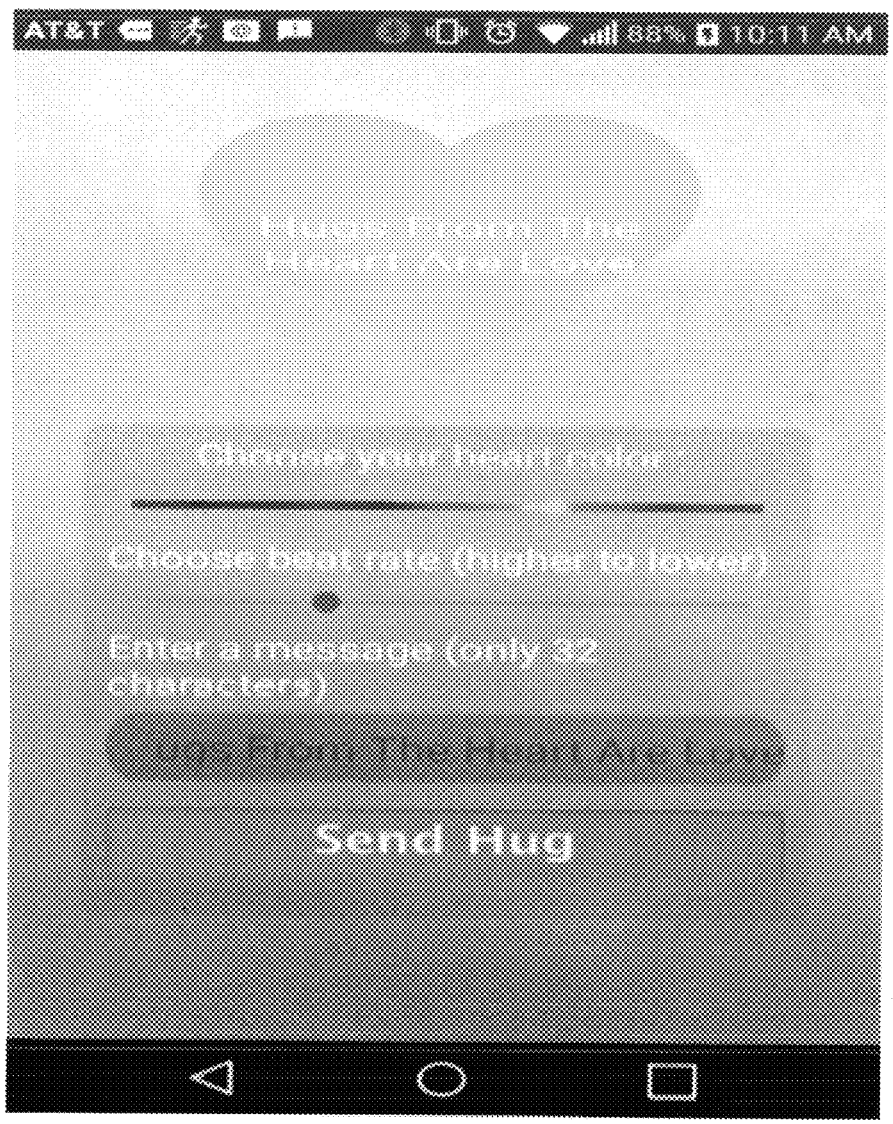
FIG. 3 Input is transformed into a new unique outcome.
Figure 4:
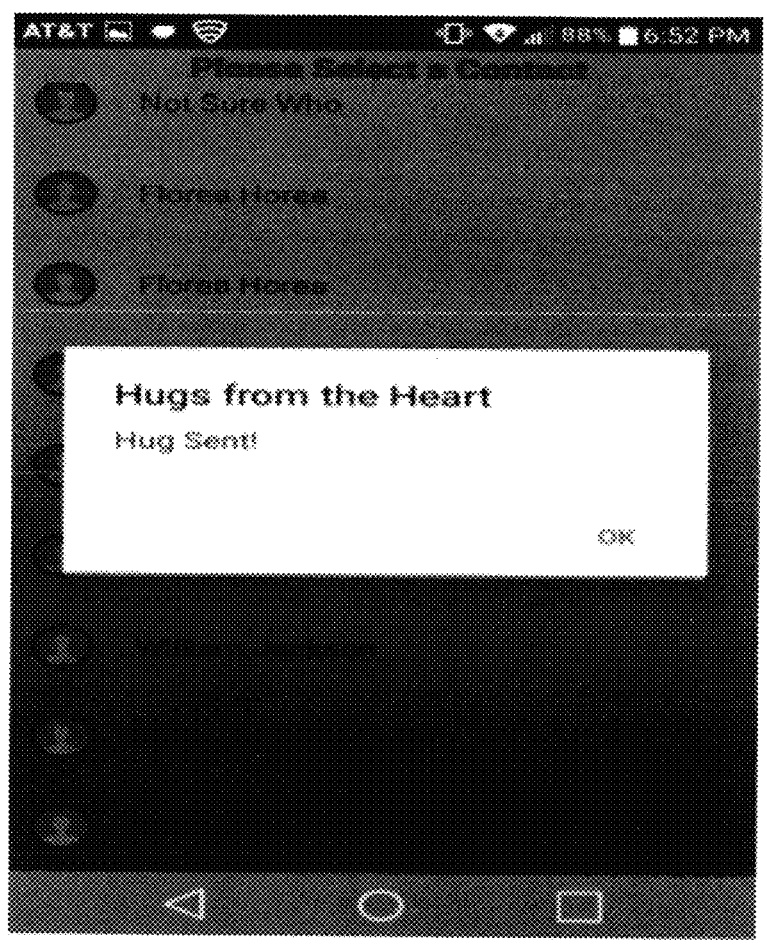
FIG. 4 The new outcome/data is transmitted.
Figure 5:
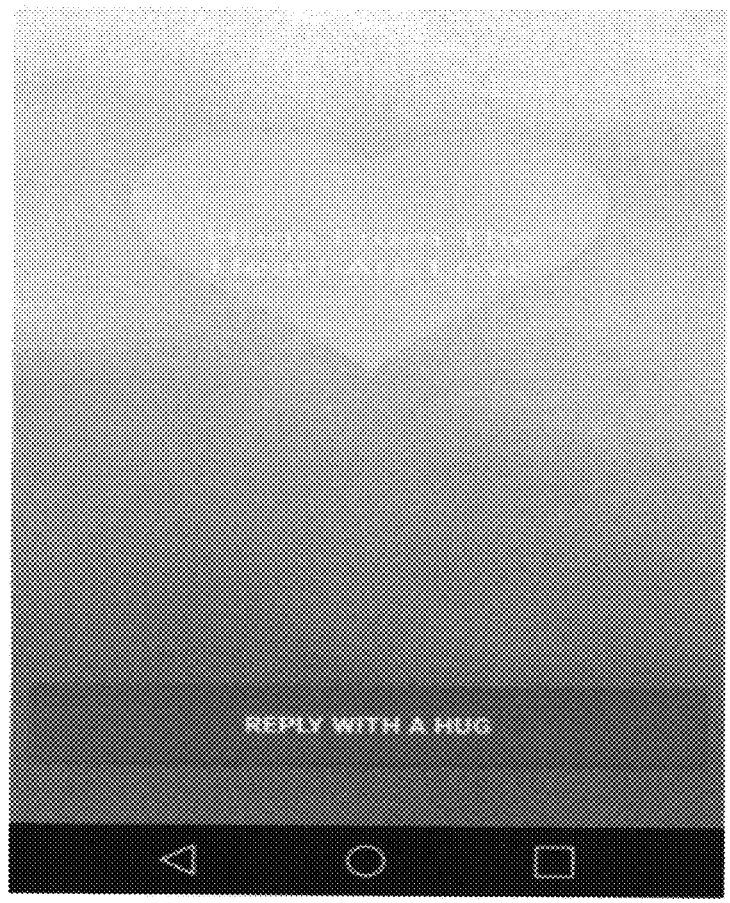
FIG. 5 The transmission is received.
Figure 6:
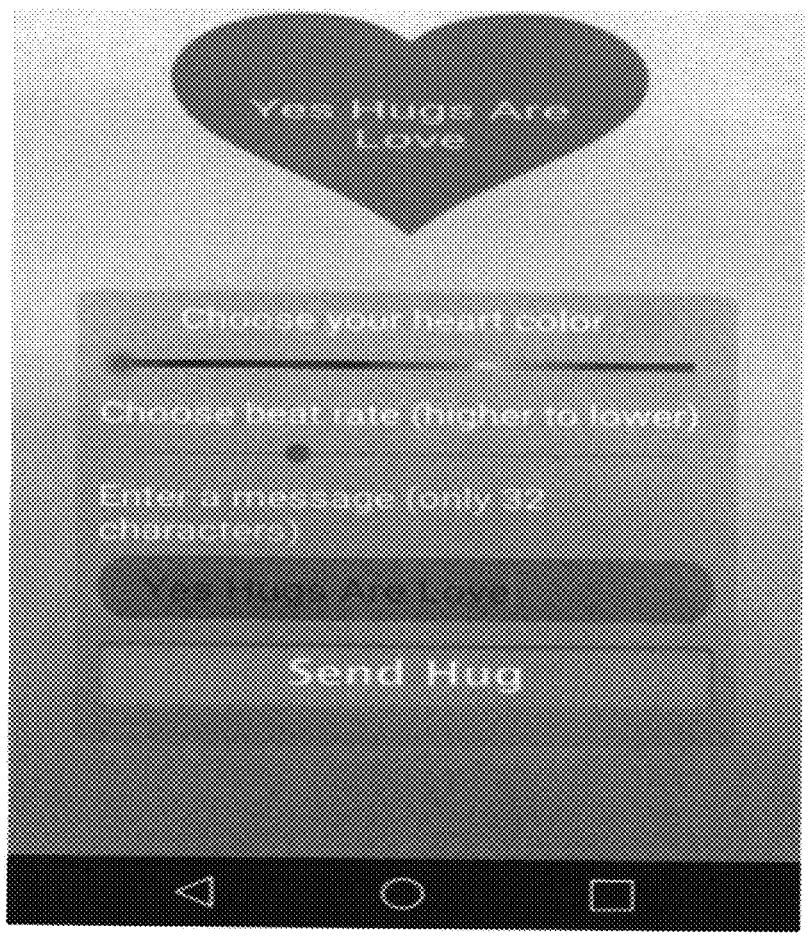
FIG. 6 A response is generated at receiver discretion.

UUVCU allows a user to uniquely change an electronic objects color, movement rate, and embed text, etc., as well as other future attributes. Hugs From The Heart (Hugs) is a small computer application (App) like a computer game that we have created as the first tangible implementation of the UUVCU. UUVCU is designed to run on cell phones and tablets, both Apple, Android and future applications like watches, monitors, server to server, computer to computer, etc. This first Hugs implementation allows a user to send a symbol (i.e., emoji). However, with the UUVCU the Hug symbol is uniquely varied by the user. Hugs are then sent and received. Hugs are then replied to if the receiver elects to reply. In other applications, data will flow, without user active engagement, i.e., sensory medical or other emergency information.

The invention claimed is:

1. A System running and using different physical electronic devices that modifies and gathers information of different base graphical elements in a specific manner for different utility uses:

wherein the system uses on one or more servers which contain processors, and both random access memory (RAM) and separate physical non-transitory memory to store digital content different from said RAM to store, to run, receive, transmit and modify base graphical elements, and base emoticons, and wherein a first user granularly modifies a selected one of said base graphical elements using said one of said processors by communicating with such processor with an electronic device, and said base emoticon to send a message in many different communication mediums, wherein the communication mediums include a messenger chat, electronic mail, an online session, an offline session, a program, and an application ran on said processors from different electronic devices of different possible users; and wherein the system is capable of running on a smart phone, a tablet, and other electronic devices; and the system further comprising a computerized device containing said different memories; and wherein said base graphical element, and said base emoticon are selected and granularly modified via a slide selector and a different granular tool to have a new and a unique output; and the changes include changing a color, a movement, an action, a rate of speed of a specific movement the base graphical element, and said base emoticon set to have, a text entry, a sound, an object size, an animation, a data collection and a transmission option all customizable by the first user; and (b) displaying on a display of the first user said base graphical element, and said base emoticon coming from the servers of the system then after the first user granularly modifies said base graphical element and said base emoticon to create the new and unique outcome specifically customized by said first user different from one any other user could create, and (c) displaying said user modified base graphical element, and base emoticon on a display of said devices of the first user for first user approval and transmission; (d) repeating steps "a, b, and c" until modifications are complete according to preferences of said first user and approving all changes by the first user; (e) transmitting said modified base graphical element and said base emoticon after being modified and all changes have been approved to said processors within said hardware server then sent to a second user; (f) said base modified said base graphical element and emoticon serves as an end message to the second user; and (g) said modified base graphical element and said modified emoticon transmits data points for data collection and targeting purposes a set of different users relative to different changes made by said users for advertising purposes; and further each set of users communicating with one another can elect to reply or not reply; and based on sensory and other emergency information there is a reply without user engagement on one end in case of an emergency situation using said electronic devices which contain the processors and memories to transmit the information back as specified modified base graphical elements, and base emoticons to let another user know there is the emergency situation taking place.

* * * * *